Feb. 23, 1954
J. J. HEGEL
2,669,783
VIEWING APPARATUS
Filed Jan. 19, 1953
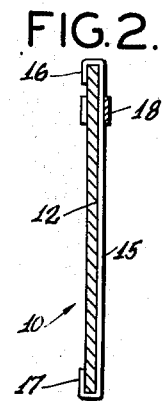
FIG. 2.
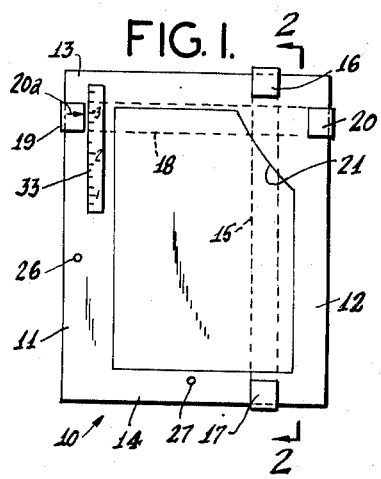
FIG. 1.
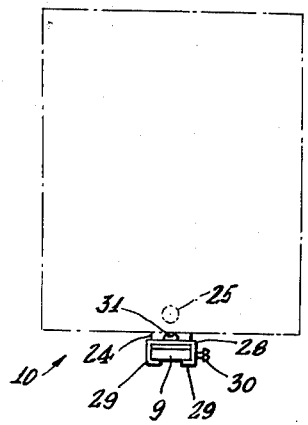
FIG. 5.
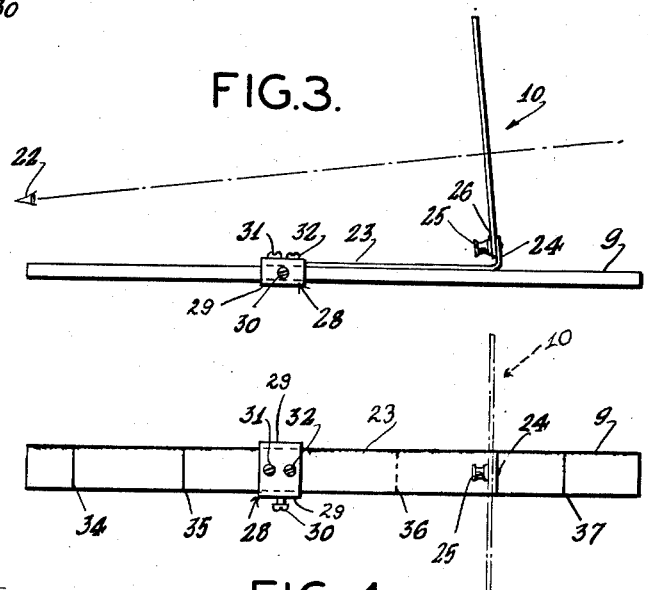
FIG. 3.
FIG. 4.
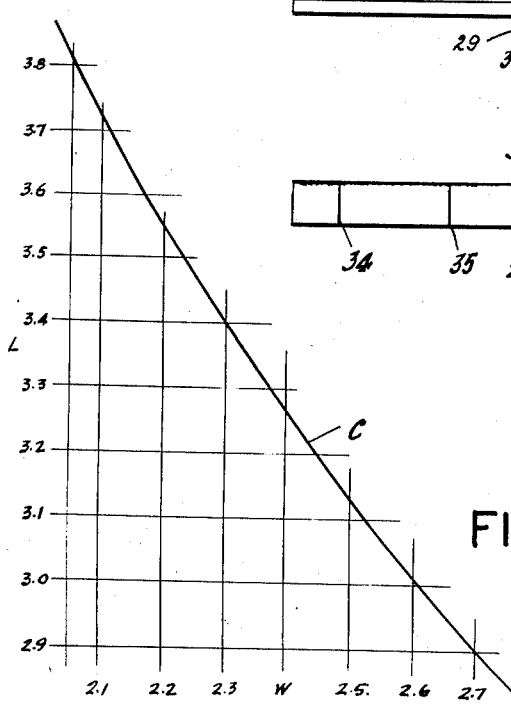
FIG. 6.
INVENTOR.
JOHN J. HEGEL
BY
H. G. Manning
ATTORNEY.

Patented Feb. 23, 1954

2,669,783

UNITED STATES PATENT OFFICE 2,669,783

VIEWING APPARATUS

John J. Hegel, Meriden, Conn.

Application January 19, 1953, Serial No. 332,063

1 Claim. (Cl. 33—64)

This invention relates to photography, and more particularly to an upstanding adjustable open frame which may be used as a convenient guide to locate the position for viewing a scene or object to produce the best arrangement, composition, and perspective of a picture to be reproduced therefrom either by photography, painting, or otherwise.

The objects of the invention are to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing, Fig. 1 represents a front view of the viewing frame.

Fig. 2 is a side sectional view of the same taken along the line 2—2 of Fig. 1.

Fig. 3 is a side view of the viewing frame as it appears when assembled upon a horizontal holding bar, upon which it is adjustably mounted.

Fig. 4 is a plan view of the holding bar, with one position of the viewing frame shown in dotted lines.

Fig. 5 is an end view of the same.

Fig. 6 is a plan view of a chart showing a constant area curve of the frame aperture by means of which the arcuate corner sector of the frame is laid out.

Referring now to the drawing in which like reference numerals denote corresponding parts throughout the several views, the numeral 9 indicates an elongated bar of rectangular cross-section, from one end of which the scene or object to be reproduced is adapted to be viewed.

The numeral 10 indicates a rectangular viewing frame having a pair of vertical side rails 11 and 12 and horizontal top and bottom rails 13 and 14 respectively. The numeral 15 indicates a vertical masking slide secured to the top and bottom rails 13 and 14 by means of end ears 16 and 17 respectively, as clearly shown in Figs. 1 and 2 of the drawing.

Provision is also made of a horizontal masking slide 18 which is held upon the vertical side rails 11 and 12 of the frame by means of end ears 19 and 20, respectively. The end ear 19 is provided at its center point with an index arrow 20a adjacent which is a vertical scale 33 indicating the ratio of the length (L) to the width (W) within the masking slides 15 and 18 of the viewing frame 10.

In the upper right hand corner of the frame 10 between the rails 12, 13, provision is made of an arcuate corner sector 21 having a shape corresponding to the shape of the "constant area" curve shown on the chart C of Fig. 6 of the drawing. The curves of the arcuate sector 21 and the chart C are so laid out that the product of the length and width of the frame between the masking bands 15 and 18 is constant at all points. In other words, all points on said curves represent equal areas of the aperture in the frame 10, which condition is obtained by causing the edges of the masking slides 15 and 18 to intersect on the edge of the arcuate sector 21, as clearly shown in Fig. 2.

The "eye" point at which the scene is to be viewed through the frame 10 is indicated by the numeral 22, and is located slightly above the rear end of the bar 9.

Mounted upon the bar 9 is an angular slide member 23 having a forwardly and upwardly inclined ear 24 at the forward end thereof, which ear is secured to the frame 10 by a thumb screw 25, as clearly shown in Fig. 3 of the drawing.

When horizontal pictures are to be taken, the thumb screw 25 will be inserted through an aperture 26 in the side rail 11 for securing the frame 10 in horizontal position, but when vertical pictures are to be taken, the thumb screw 25 will be inserted in the aperture 27 formed in the bottom rail 14 of the frame 10.

The forward end of the angular slide member 23 is provided with a U-shaped bracket 28 having depending side clips 29 which are bent inwardly underneath the bar for frictionally embracing the same, as shown in Fig. 5. The bracket 28 is adapted to be held in any desired adjusted position upon the bar 9 by means of a horizontal set screw 30 passing through one of the side cups 29.

The angular slide member 23 is adapted to be secured to the bracket 28 by means of a pair of vertical machine screws 31, 32 as clearly shown in Fig. 3.

In order to facilitate the use of the apparatus, provision is made of a plurality of frame setting points (or position members) of which only four (34, 35, 36, 37) are marked on the bar 9 as shown in Fig. 4 of the drawing. When the forward edge of the slide 23 is brought into alignment with a particular setting point, the frame 10 will be in the proper viewing position for the desired medium of reproduction, such as a catalog, an exhibition picture, a magazine cover, a calendar or a billboard.

OPERATION

In operation, the scene to be reproduced will be viewed from the eye point 22 through the viewing frame 10 which will be adjusted back and forth on the bar 9 until the entire scene is properly framed therein.

By the use of the present invention the reproduction will have a natural appearance regardless of the size to which it is enlarged or reduced because of the normal action of the operator in subconsciously adapting the distance between the eyes and the reproduction.

The viewing end of the bar 9 will preferably be placed against the cheekbone of the operator with the viewing frame 10 in slightly inclined upright position.

The operator will then sight through the viewing frame 10 with his eye located slightly above the elongated bar 9 at the point 22 so as to frame the scene between the masking slides 15 and 18.

The viewing frame 10 will be assembled for a horizontal scene by inserting the thumb screw 25 in the hole 26 in the side rail 11 of the viewing frame 10. For a vertical scene, the thumb screw 25 will be inserted in the hole 27 of the bottom rail 14.

The viewing slide 23 will then be located at the proper position number (34—37) on the bar 9.

While viewing the scene or object, the masking slides 15, 18 will be adjusted and the position of the scene or objects being viewed will be varied until the most pleasing composition of the scene is obtained.

The scene as reproduced from the viewing frame 10 should be a duplicate of the original scene with the same setting.

When the scene is to be reproduced by photography, or some related mechanical method, the focal point of the camera lens should be placed at the same position as the eye point 22.

When printing a negative produced by a camera, the printing masks would be set at the same L-W ratio as determined by the viewing frame scale 33.

After the picture has been printed, the best position for viewing it will be obtained when the inside edge of the frame coincides with the outside edge of the print.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new and for which it is desired to secure Letters Patent is:

In a guide for determining the best position for viewing a scene to produce the most pleasing arrangement, composition, and perspective of a picture to be reproduced from said scene, an elongated bar, a slide member movable on said bar to any desired adjusted position, a rectangular upstanding open frame member secured to said slide member, the forward end of said bar serving as the point from which the scene is to be viewed, said frame member having a slidable vertical masking strip, and a slidable horizontal masking strip to permit the length and width of the frame aperture to be adjusted, one corner of said frame having an arcuate sector which is laid out in such a manner that when the edges of said strips intersect on the edge of said sector, the areas within said strips will be constant.

JOHN J. HEGEL.

References Cited in the file of this patent

UNITED STATES PATENTS

| Number | Name | Date |
|---|---|---|
| 1,771,903 | Soth | July 29, 1930 |
| 2,222,297 | Mesjian | Nov. 19, 1940 |

FOREIGN PATENTS

| Number | Country | Date |
|---|---|---|
| 10,294 | Great Britain | May 2, 1906 |
| 23,673 | Great Britain | Oct. 24, 1906 |
| 607,532 | France | Mar. 27, 1926 |
| 758,595 | France | Nov. 3, 1933 |